United States Patent Office 3,208,528
Patented Sept. 28, 1965

3,208,528
TREATMENT OF WATER-SENSITIVE FORMATIONS
James J. Elliott and Frank O. Jones, Jr., Tulsa, Okla., assignors to Pan American Petroleum Corporation, Tulsa, Okla., a corporation of Delaware
No Drawing. Filed Nov. 16, 1961, Ser. No. 152,929
11 Claims. (Cl. 166—42)

The present invention is concerned with treatment of water-sensitive underground formations. More particularly, it relates to a novel method for preventing clay blocking and resultant loss of permeability in such formations when the latter come in contact with low-salinity liquids.

Briefly, we have found that a water-sensitive formation containing native water having at least about 5 percent of its dissolved salts in the form of divalent cation salts, can be exposed to fresh water, without impairment of permeability, if the fresh water is treated so that at least about 5 percent of its dissolved salts are divalent cation salts. In some instances such as in the case of flooding operations, it is desirable to reduce the salinity of the injected water gradually or in step-wise fashion until the solids concentration therein is approximately equivalent to that of the liquid to be used in the flood. It is important to stress, however, that during this reduction of salts or solids content in the treating liquid, the amount of divalent cation salt or salts present ordinarily should not be less than about 5 percent, based on the weight of dissolved salts present in the liquid used for a given injection step. One of the important features of our invention resides in the fact that we have found only a small amount, e.g., at least about 5 percent, of the salts dissolved being divalent salts to be necessary in order to nullify the tendency of the sodium salts to render clays dispersible in fresh water.

It is known that in many formations the injection of fresh water causes a marked reduction in permeability. This problem, of course, becomes a major factor in waterflooding operations because of the resulting increased injection pressure and lengthening of time required for the flood. In some instances, the formation may become completely plugged. This reduction in permeability of the formation is caused by the flow channels therein becoming obstructed by clays or other mineral fines dispersed by the fresh water. Experimental evidence shows that the dispersed particles bridge, to partially dam interstices in the rock. It is known that this phenomenon, hereafter referred to as "clay blocking," is not encountered when the flood water has a high-salt content. If clays are exposed, for instance, to a 50,000 p.p.m. sodium chloride solution, permeability is not reduced; however, when exposed to solutions weaker than about 5,000 p.p.m., clay dispersion causes loss of permeability. On the other hand, if clays are exposed to a comparably strong calcium chloride solution, subsequent exposures to a very dilute calcium chloride solution, or even distilled water, results in little or no permeability damage, i.e., dispersion of clays.

The explanation for such behavior lies in the fact that (1) Clays are cation exchange or base exchange materials similar, in this respect, to zeolites or exchange resins, and
(2) Clays in the calcium exchange form do not disperse easily in fresh water, while clays in the sodium form disperse very easily in such water.

The base exchange form of a clay is easily altered by flowing another solution through it. A sodium clay, for example, can be changed to a calcium clay simply by passing a calcium chloride solution through the clay bed.

It is therefore an object of our invention to take advantage of the above-mentioned characteristics of such clays in waterflooding operations whereby the harmful effects of clay blocking of the formation during flooding operations is prevented. It is another object of our invention to condition or treat a water-sensitive formation by varying the salinity so that the salt content of the injected water (liquid) is reduced gradually or in step-wise fashion while maintaining constant the ratio of total salt concentration to divalent cation salt concentration until the salt concentration in the water being injected has reached the desired degree of dilution.

In carrying out an embodiment of our invention the characteristics of the native water present in the oil reservoir to be flooded are first determined. In most cases this information is already available in published formation water analysis reports. For the process of our invention to be applied to a given water-sensitive oil-bearing formation, the native water present in the latter should contain at least about 5 percent divalent cation salts, based on the weight of dissolved salts in the native water. The fresh water to be initially injected generally contains about one-half the concentration of dissolved salts present in the native water, or not over about 15,000 p.p.m., whichever is less. The fresh water likewise should contain at least 5 percent divalent cation salts but preferably 10 percent such as the alkaline earth salts, for example, calcium and/or magnesium chloride, based on the weight of total dissolved salts therein.

For example, if the native water contains 75,000 p.p.m. total dissolved salts, there should be present 7,500 p.p.m. of a suitable water-soluble alkaline earth metal salt. If the invading or injection water contains, for instance, 200 p.p.m. total dissolved salts, then the alkaline earth metal salt should be present in a concentration of about 20 p.p.m. to prevent clay blocking. There is one major qualification to the foregoing fundamental requirement, and that is it is frequently necessary to decrease gradually the salinity of the invading water such as in a series of step-wise operations where it is desired ultimately to flow fresh water through the formation without causing permeability damage. Thus, a potentially water-sensitive formation containing a native water having a dissolved salts concentration of 100,000 p.p.m. could be flooded using a fresh water with 100 p.p.m. of dissolved salts if the native water contained, for example, about 10,000 p.p.m. of a calcium or a magnesium salt, and if the fresh water contained at least 10 p.p.m. calcium or magnesium salts. To avoid damage because of high salinity contrast, it is preferable in some instances to decrease salinity gradually or step-wise. The first bank of invading water may contain about 10,000 p.p.m. of divalent cation salts, the second about 5,000 p.p.m., the third 2,000 p.p.m., the fourth 1,000 p.p.m., the fifth 500 p.p.m., the sixth 200 p.p.m. and, finally, the flooding operation itself can be initiated with a flood water having salinity content of 100 p.p.m. It would also be satisfactory to slowly and continuously decrease salinity, however the step-wise procedure has the advantage of being easier to conduct. In each of these preceding steps it is to be understood that the divalent cation salt is present in the invading water in an amount corresponding to at least about 5 percent, based on the weight of the total dissolved salts. The volumes of the banks of invading water employed under such circumstances ordinarily need not be large, typically in the range of 10 to 100 barrels per bank or slug.

In this connection, sufficient water should be introduced to penetrate the formation for a radial distance of at least about 5 inches from the face of the well bore. To accomplish this, the treating or injection water should be used in an amount corresponding to at least about 0.5 gallon per linear foot of formation. Ordinarily, we prefer to employ from about 1 to 10 barrels of water per foot of formation. The quantity of water required to obtain the aforesaid minimum 5-inch penetration will, of course, vary with the nature of the formation; however, in the majority of instances we have found that from about 1 to about 10 barrels per foot of formation is adequate to obtain this degree of penetration even in the case of heterogeneous formations. These quantities of water should be used in each injection step. Larger amounts of invading water may be used, however, they are ordinarily not economically justified.

After the treating water has been introduced, whether in the form of a single slug or a series of slugs of varying salt content, the flooding operation is carried out with a flooding water which may have a salt concentration of, for example, 105 p.p.m. sodium chloride and 11 p.p.m. calcium chloride. As the slugs of treated water progress through the formation to the output wells, they tend to mix, and the composition of the liquid from the leading edge thereof changes much more gradually. Nevertheless, the formation downstream from the injection wells, as it comes into contact with the treating liquid, in effect is conditioned in somewhat the same way as the formation near the well bore. Thus, the salt concentration of the treating fluid decreases slowly from the leading edge thereof back to the injection well, thereby affording an opportunity for the formation to be contacted by a liquid having not only a progressively decreasing salt concentration, but a total dissolved salt ratio suitable for stabilizing formation clays in accordance with our invention. As a result, the entire body of formation being flooded is conditioned for subsequent contact with the injected fresh water without fear of difficulties arising from clay blocking.

To demonstrate the phenomenon of preventing clay blocking through the step-wise reduction in salinity of the treating water a series of tests on a water-sensitive formation was undertaken. In this work, tests were conducted through a core from said formation at known pressure differentials and at measured flow rates. Pressure gradients varied from 2 to 50 p.s.i. per inch. Test solutions were filtered through fine, fritted glass discs to prevent plugging the cores by suspended solids in the liquids. Cores used in the study were from samples of formations representative of many water-sensitive types. The cores prior to use, were thoroughly cleaned and dried. While it might be felt, in some respects, that these tests would have been more realistic if native-state cores were used, we feel that the clay effects produced under the conditions of our trials equaled or exceeded those encountered in native cores.

To afford a basis for comparison, the effect of step-wise reduction in concentration of sodium chloride solutions passing through a typical water-sensitive rock (Berea sandstone) is shown in Table I below.

*Table I*

| Sodium chloride solution, concentration, p.p.m.: | Permeability (millidarcys) after one hour |
|---|---|
| 58,500 | 218 |
| 29,200 | 212 |
| 14,600 | 216 |
| 7,300 | 206 |
| 5,600 | 206 |
| 3,650 | 162 |
| 1,830 | 146 |
| 1,170 | 114 |
| 585 | 6 |

From these tests it is seen that solutions containing less than 5,000 p.p.m. sodium chloride caused damage and that permeability is severly affected by solutions containing less than 1,000 p.p.m. sodium chloride since 50 percent permeability is lost at concentrations of 1170 p.p.m., while more than 95 percent is lost with solutions having 585 p.p.m. sodium chloride. This, of course, is what would be expected since the clays are in the sodium base exchange form and are readily dispersed by fresh water.

Substitution of calcium for only 10 percent of the sodium in the solutions used in obtaining the data appearing in Table I prevents clay damage as shown in Table II below. In this series of runs a Berea sandstone core was also used. This work demonstrates clay stabilization by the use of a divalent cation salt—in this case calcium chloride—in conjunction with the step-wise reduction in salinity of the treating water.

*Table II*

| Composition | | Permeability (Millidarcys) After One Hour |
|---|---|---|
| Sodium Chloride In Solution Concentration, p.p.m. | Calcium Chloride In Solution Concentration, p.p.m. | |
| DECREASING CONCENTRATION STEPWISE | | |
| 52,600 | 5,500 | 228 |
| 5,260 | 550 | 238 |
| 526 | 55 | 220 |
| 263 | 27 | 224 |
| 105 | 11 | 218 |
| DECREASING CONCENTRATION ABRUPTLY | | |
| 52,600 | 5,500 | 220 |
| 105 | 11 | 38 |

The total concentration of solutions passing through the core in Table II was decreased from 52,600 p.p.m. sodium chloride and 5,550 p.p.m. calcium chloride to a low of 105 p.p.m. sodium chloride and 11 p.p.m. calcium chloride with no significant change in permeability.

The results in Table II when compared with those in Table I demonstrate the ability of a small proportion of calcium to prevent clay damage.

The importance of decreasing salinity slowly in changing to the flow of fresher water is also shown in Table II. Thus, it is demonstrated that if a small proportion of calcium is present, total salinity may be decreased from 58,100 p.p.m. to 116 p.p.m. without affecting permeability if the decrease is brought about gradually; however, if the change is abrupt, permeability can be damaged. In this case, 80 percent of the permeability was lost upon abruptly decreasing salinity. In other words, 116 p.p.m. water (containing divalent cation) could be flowed through the core without harming permeability if the salinity was decreased slowly, but the same water caused serious damage when injected directly after a strong brine despite the presence of divalent cation in both waters.

The core used for the tests reported in Table II was proved to be water sensitive to the same degree as the core used in connection with the work reported in Table I. Clays were converted to the sodium form by flowing 58,500 p.p.m. sodium chloride solution and then distilled water. The permeability fell to about 1 percent of its original value.

It should be pointed out that the results shown in Tables I and II are typical of many water-sensitive formations such as, for example, Nellie Bly, Shannon, Third Sundance, Massive, Massive Wilcox, Tensleep, Deese, Bartlesville, Frio, Oil Creek, Dakota, Yegua, and Paluxy. Water-soluble magnesium salts such as, for example, magnesium chloride, when substituted for calcium chloride gave similar results.

Our work with cores containing oil showed that the same general conclusions concerning the effect of water composition on permeability to water can be made as in the case of the work described above. The chief difference is that water permeability at all salinity levels is lower because of the presence of oil. This is at least partly because the immiscible oil interferes with the flowing water and cannot be removed below a certain level of saturation. This reduction in permeability is not caused by clays, although relative permeability reductions and clay blocking of water permeability serve to compound one another.

In a third series of tests work was conducted to determine the applicability of our invention to a Berea sandstone core containing irreducible oil saturation. The treating solution contained calcium and sodium salts in a ratio of 1:7. The results are shown in the table below.

*Table III*

| Sodium Chloride In Solution Concentration, p.p.m. | Calcium Chloride In Solution Concentration, p.p.m. | Permeability of Core (Millidarcys) After One Hour |
| --- | --- | --- |
| 51,100 | 6,950 | 12 |
| 5,100 | 695 | 13 |
| 1,020 | 139 | 13 |
| 255 | 35 | 13 |
| 128 | 17 | 13 |
| 51 | 7 | 12 |

It is seen that permeability changed over a range of only about a millidarcy, even though salinity was reduced from almost 60,000 p.p.m. to about 50 p.p.m. Subsequent tests showed the core was capable of clay damage when not stabilized by the small proportion of calcium.

From the foregoing description it will be seen that we have described a method for the prevention of permeability damage by clay effects through the presence of relatively small proportions of an alkaline earth metal salt in both the native and invading waters. We have further shown that damage by the use of fresh water can be avoided by means of gradually lowering salinity in the invading water from the level of the formation water to the level of salinity of the fresh water.

The expression, "fresh water," as used in the present description and claims is intended to refer to any water having a maximum salt content of about 15,000 p.p.m. Generally speaking, this maximum may be further reduced to a value of not more than 4,000 to 5,000 p.p.m.

We claim:

1. In a method for the prevention of clay blocking in a water-sensitive underground clay formation containing native water in which at least about 5 percent of the solids dissolved in said native water represent divalent cation salts, the improvement which comprises:

injecting into said formation a liquid having a salinity of not more than about 15,000 p.p.m. of which at least about 5 percent of the dissolved salts in said liquid are divalent cation salts, said liquid being injected into said formation in an amount corresponding to at least about 0.5 gallon per linear foot thickness of formation being treated, repeating said injection step a plurality of times under the aforesaid conditions while reducing the dissolved solids concentration contained in the liquid thus injected at each such step, maintaining the concentration of said divalent cation salts at at least about 5 percent of the dissolved solids contained in the liquid for any given injection step, and continuing this cycle until the liquid being injected has reached the desired degree of dilution with respect to the dissolved solids in said formation.

2. The method of claim 1 in which the divalent cation salts are alkaline earth metal salts and the liquid is water.

3. The method of claim 1 in which said formation is an oil-bearing formation.

4. The method of claim 2 in which the concentration of dissolved solids in said liquid is gradually decreased throughout the process.

5. The method of claim 2 in which the alkaline earth metal salt is calcium chloride.

6. The method of claim 2 in which the alkaline earth metal salt is magnesium chloride.

7. The method of claim 2 in which the injected water is used in an amount corresponding to from 1 to 10 barrels per linear foot thickness of formation.

8. In a method for the prevention of clay blocking in a water-sensitive underground formation containing native water in which at least about 5 percent of the solids dissolved in said native water represent diavlent cation salts, the improvement which comprises:

injecting into said formation a liquid having a salinity of not more than about 15,000 p.p.m., of which at least about 5 percent of the dissolved salts in said liquid are divalent cation salts, said liquid being injected into said formation in an amount corresponding to at least about 0.5 gallon per linear foot thickness of formation being treated, repeating the injection of said liquid into said formation a plurality of times under the aforesaid conditions while reducing the dissolved solids content of said liquid to a value approximately one-half of said solids present in the preceding injection step, maintaining a divalent cation salt concentration in the injection liquid for each such step at a level of at least about 5 percent of said solids, and repeating this cycle until the injection liquid has reached the desired degree of dilution with respect to the solids in said native water.

9. The method of claim 8 in which the divalent cation salt is an alkaline earth metal salt, the injected liquid is water and the latter is injected into said formation in an amount corresponding to from about 1 to about 10 barrels per linear foot of formation.

10. The method of claim 9 in which the alkaline earth metal salt is calcium chloride.

11. The method of claim 9 in which the alkaline earth metal salt is magnesium chloride.

References Cited by the Examiner

UNITED STATES PATENTS 2,841,222   7/58   Smith _____ 252—8.55

OTHER REFERENCES

Jones, O. W. et al.: Electrical Resistivity of Oil Field Brines, in the Petroleum Engineer, November 1958, page B–42.

Moore, J. E.: How to Combat Swelling Clays, in the Petroleum Engineer, March 1960, page B–99.

CHARLES E. O'CONNELL, *Primary Examiner.*

BENJAMIN HERSH, *Examiner.*